March 5, 1957     C. G. McCLURE     2,783,642

APPARATUS FOR GENERATING SURFACE WAVES

Filed July 8, 1954

United States Patent Office 2,783,642
Patented Mar. 5, 1957

2,783,642

APPARATUS FOR GENERATING SURFACE WAVES

Charles G. McClure, Brookfield, Conn., assignor to Sperry Products, Inc., Danbury, Conn., a corporation of New York Application July 8, 1954, Serial No. 441,979

1 Claim. (Cl. 73—67.8)

This invention relates to the generation of ultrasonic surface waves in one surface of an object. It has heretofore been disclosed in the pending application of John C. Smack and Howard E. Van Valkenburg Serial No. 266,512, filed January 15, 1952, how surface waves could be generated in one surface of an object by means of an X-cut quartz crystal inclined at a predetermined angle and adapted to transmit ultrasonic vibrations through an intervening medium such as a plastic wedge. When the angle of transmission is such that the beam within the object is refracted at an angle in excess of the critical angle for longitudinal and shear waves therein, there is obtained a surface wave on one surface of the object as described in said patent application and as described in a paper entitled "Surface Waves at Ultrasonic Frequencies" by E. G. Cook and H. E. Van Valkenburg in the American Society for Testing Materials Bulletin for May 1954, pages 81 to 84 inclusive. In the utilization of such method for generating surface waves it is a condition precedent that the medium, such as the plastic wedge, through which the X-cut crystal transmits its vibrations shall have an acoustic velocity lower than the acoustic velocity of the material in which the surface waves are to be generated. This creates a problem in the case of certain objects such as lead and uranium which have a relatively low acoustic velocity so that it is difficult and almost impossible to find transmitting materials for the intermediate wedge of an acoustic velocity lower than that of the object.

It is therefore one of the principal objects of this invention to provide a method whereby surface waves may be generated in objects of relatively low acoustic velocities.

Further objects and advantages of this invention will become apparent in the following detailed description thereof.

In the accompanying drawings.

Figure 1:
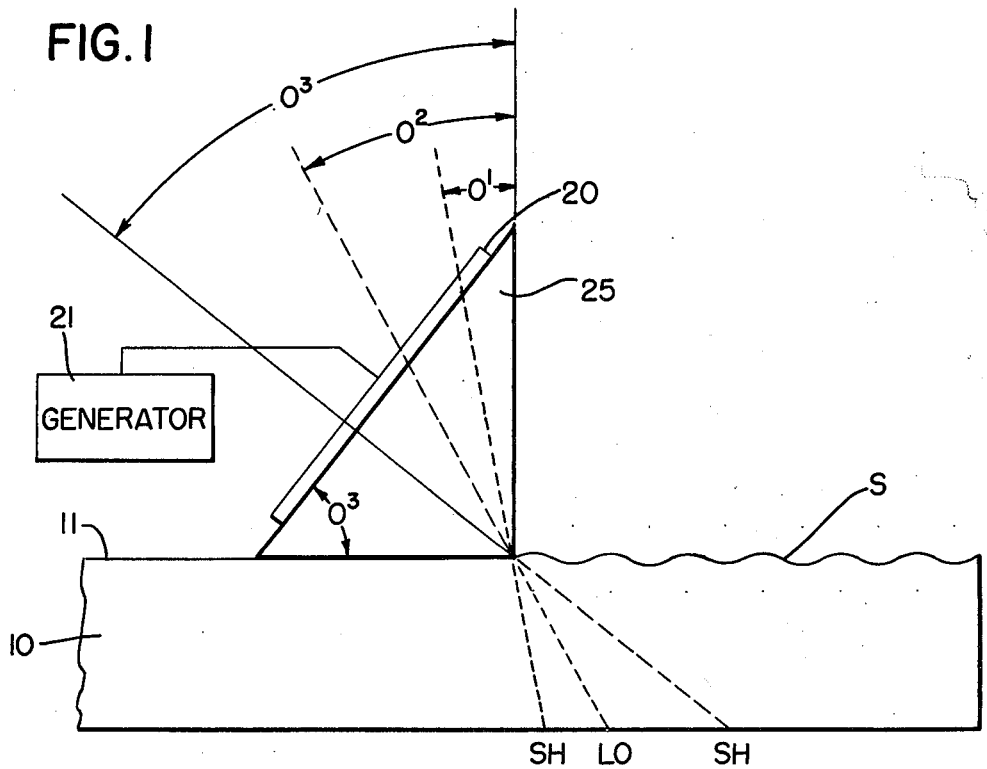
Fig. 1 is a view largely diagrammatic illustrating the theory underlying this invention.

Referring to Fig. 1 there is shown an object 10 which may be in the form of a slab of material in one surface 11 of which it is desired to generate surface waves. The utility of such surface waves is well known in that pulses of such waves may be utilized by the Reflectoscope method for the purpose of detecting surface defects such as discontinuities. The method which has heretofore been proposed in the hereinbefore mentioned patent application and technical paper consists in utilizing an X-cut quartz crystal 20 which may be energized from any suitable source of high frequency electric current 21 to cause mechanical vibrations of said quartz crystal, which vibrations may be transmitted into the object 10 through a suitable acoustic conducting medium such as a plastic wedge 25. If the acoustic beam is transmitted into the object at an angle of incidence $O^1$, then the beam will be refracted in the material 10 into a longitudinal beam LO and a shear beam SH, as indicated in dash lines, assuming that the acoustic velocity in the material is greater than in the intermediate conductor 25. If the angle of incidence is $O^2$, as indicated by dash lines, then the longitudinal waves which travel at a higher velocity and therefore are refracted at a greater angle will be refracted out of the object 10 to leave only the shear waves SH, as shown by the dash lines. In the aforementioned copending application of Smack and Van Valkenburg it was further disclosed that if the angle of incidence is increased to $O^3$, beyond the critical angle where the shear waves are refracted out of the material 10, then there will be generated in the object 10 surface waves S as shown in greatly exaggerated form in the drawings.

It will be apparent that the acoustic velocity of the medium 25 must be less than that of the object 10 if the proper degree of refraction is to be obtained within practical limits for producing the shear waves S. The medium 25 which is usually employed may be a Lucite (methyl methacrylate) wedge having an acoustic velocity for longitudinal waves of 2.6 cm./sec. It will be seen that a wedge of such material could not be employed for instance with lead, having a longitudinal wave velocity therein of 2.4 cm./sec., or even with uranium having a longitudinal wave velocity of 3.19 cm.sec. because the difference in velocities is so small that a prohibitively large angle of incidence would have to be employed. Since the amount of energy transmitted diminishes as the angle of incidence increases, it would result in inadequate energy being transmitted into the uranium. Suitable wedge materials for generating surface waves in substances of such low acoustic velocity as lead and uranium are difficult to obtain. Therefore I have devised the following method by which surface waves can be obtained in materials of low acoustic velocity utilizing materials already well known and standard in the art.

Figure 2:
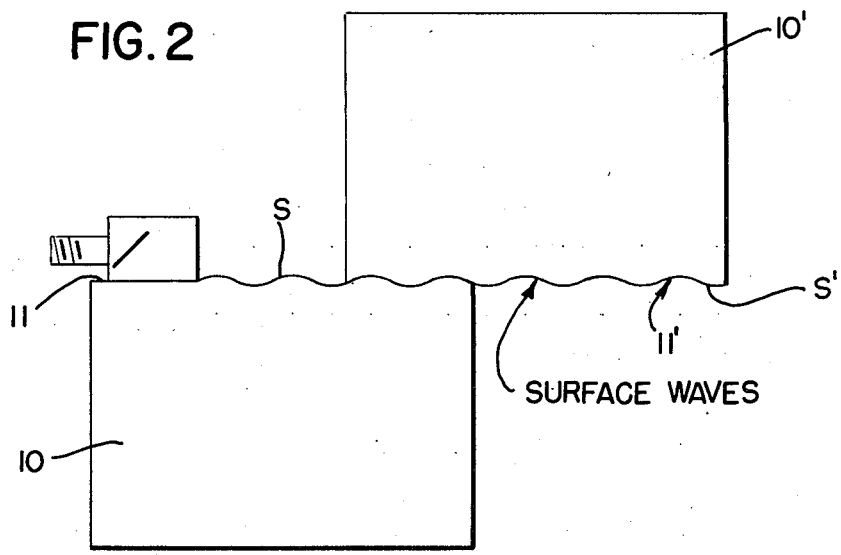
Fig. 2 is a view also largely diagrammatic showing the method by which surface waves may be generated in materials of relatively low acoustic velocities.

To accomplish the foregoing purpose my method as shown in Fig. 2 consists first in generating surface waves in an object 10 of relatively high acoustic velocity such as steel (6.07 cm./sec.) or tungsten (5.4 cm./sec.) by the utilization of a standard wedge 25 of material such as Lucite. Surface waves can be generated in such a body 10 without difficulty. The second step of the method consists in applying the surface S of the material 10 to the surface S' of the material 10' of low acoustic velocity, such as lead or uranium. I have discovered that the surface waves S of surface 11 of object 10 will generate surface waves S' in the surface 11' of object 10' when surface 11 makes contact with surface 11'. By this method therefore surface waves may be generated in bodies of material which would otherwise present practical difficulties and require the utilization of special materials and special arrangements. By this method standard materials and arrangements may be employed and surface waves may be transferred by contact from one material to another.

Having described my invention, what I claim and desire to secure by Letters Patent is:

Apparatus for producing ultrasonic vibrational surface waves in the surface of an object having such a low acoustic propagation velocity that direct wedge refraction is inoperative to produce surface waves therein, either by reason of the fact that the critical angle of incidence cannot be exceeded or that said critical angle is so large that the energy intensity of the surface waves produced is inadequate, said apparatus comprising a body of material having an acoustic velocity substantially higher than that of the object, a wedge of material having an acoustic velocity less than that of said material, an ultrasonic transducer coupled to one surface of said wedge, and a surface of said body being coupled to another surface of said wedge, and means for driving said transducer to generate surface waves in that surface of the body coupled to said wedge, the object being positioned with one surface thereof in contact with that surface of said body in which said surface waves are generated, whereby to induce the desired surface waves in the named surface of said object.

References Cited in the file of this patent

UNITED STATES PATENTS

| | | |
|---|---|---|
| 2,439,130 | Firestone | Apr. 6, 1948 |
| 2,592,135 | Firestone | Apr. 8, 1952 |
| 2,660,054 | Pringle | Nov. 24, 1953 |

FOREIGN PATENTS

| | | |
|---|---|---|
| 708,234 | Great Britain | Apr. 28, 1954 |